United States Patent
Kayastha et al.

(10) Patent No.: US 11,475,204 B2
(45) Date of Patent: Oct. 18, 2022

(54) SYSTEMS AND METHODS FOR MANAGING DIGITAL DESIGN FORMATS ACROSS A PLURALITY OF ONLINE SERVICES

(71) Applicant: CIMPRESS SCHWEIZ GMBH, Winterthur (CH)

(72) Inventors: Christina Kayastha, Cambridge, MA (US); Lorenzo Gomez Garchitorena, Woburn, MA (US); Mikael Edwards, Clarksburg, MD (US); Alyssa Joy Parelli, Woburn, MA (US); Jayabascar Rajagopal, Burlington, MA (US); John E. Gillespie, IV, Silver Spring, MD (US)

(73) Assignee: CIMPRESS SCHWEIZ GMBH, Winterthur (CH)

( * ) Notice: Subject to any disclaimer, the term of this patent is extended or adjusted under 35 U.S.C. 154(b) by 0 days.

(21) Appl. No.: 17/221,637

(22) Filed: Apr. 2, 2021

(65) Prior Publication Data

US 2021/0312117 A1 Oct. 7, 2021

Related U.S. Application Data

(60) Provisional application No. 63/004,762, filed on Apr. 3, 2020.

(51) Int. Cl.
*G06F 40/103* (2020.01)
*G06F 3/04842* (2022.01)

(52) U.S. Cl.
CPC ........ *G06F 40/103* (2020.01); *G06F 3/04842* (2013.01)

(58) Field of Classification Search
None
See application file for complete search history.

(56) References Cited

U.S. PATENT DOCUMENTS

| 8,078,963 | B1 * | 12/2011 | Rosner | G06F 40/186 |
| | | | | 715/255 |
| 2004/0120574 | A1 * | 6/2004 | Rosenholtz | G06T 11/60 |
| | | | | 382/165 |
| 2005/0075746 | A1 * | 4/2005 | Malone | H04N 1/3871 |
| | | | | 700/97 |

(Continued)

OTHER PUBLICATIONS

Coyier, Exporting Images in Multiple Resolutions Simultaneously, The Media Temple Blog, accessed online at: <https://mediatemple.net/blog/design-creative/exporting-images-multiple-resolutions-simultaneously/> posted Dec. 22, 2016.

(Continued)

*Primary Examiner* — Mandrita Brahmachari
(74) *Attorney, Agent, or Firm* — Marshall, Gerstein & Borun LLP

(57) ABSTRACT

Systems and methods for managing formats for a digital design are disclosed. According to certain aspects, an electronic device may support a design application that may enable a user to create and edit a digital design across multiple formats associated with multiple online services. The design applications enables the effective and efficient editing of the formats such that the digital design maintains a similar look and feel for each format. In embodiments, the design application may interface with the multiple online services to access formatting parameters and upload the respective formats for the digital design.

17 Claims, 11 Drawing Sheets

(56) References Cited

U.S. PATENT DOCUMENTS

| | | | |
|---|---|---|---|
| 2006/0293905 A1* | 12/2006 | Ramanathan | G06Q 10/10 |
| | | | 709/206 |
| 2007/0019924 A1* | 1/2007 | Teo | H04N 1/00458 |
| | | | 386/278 |
| 2008/0155025 A1* | 6/2008 | Xu | G06Q 10/10 |
| | | | 709/206 |
| 2009/0119581 A1* | 5/2009 | Velusamy | G06F 40/274 |
| | | | 715/256 |
| 2011/0026899 A1 | 2/2011 | Lussier et al. | |
| 2016/0125551 A1* | 5/2016 | Saimani | G06Q 40/12 |
| | | | 705/30 |
| 2018/0020076 A1* | 1/2018 | Porwal | G06F 16/22 |
| 2019/0213238 A1* | 7/2019 | Batra | G06F 40/106 |
| 2019/0266668 A1* | 8/2019 | Vail | G06Q 30/018 |
| 2020/0315322 A1* | 10/2020 | Bowyer | A45D 44/005 |

OTHER PUBLICATIONS

International Application No. PCT/IB2021/052787, International Search Report and Written Opinion, dated May 21, 2021.

\* cited by examiner

SYSTEMS AND METHODS FOR MANAGING DIGITAL DESIGN FORMATS ACROSS A PLURALITY OF ONLINE SERVICES

CROSS-REFERENCE TO RELATED APPLICATIONS

This application claims priority to U.S. Patent Application No. 63/004,762, filed Apr. 3, 2020, the disclosure of which is hereby incorporated by reference in its entirety.

FIELD

The present disclosure is directed to improvements related to creating and editing digital designs. More particularly, the present disclosure is directed to platforms and technologies for creating and editing digital designs across multiple formats associated with multiple online services.

BACKGROUND

Individuals or customers frequently create digital designs for various purposes, and communicate and/or share the digital designs using various websites, services, and/or the like. For example, businesses create digital designs highlighting their businesses for marketing purposes, and share the digital designs on social networking services. Typically, various online and offline design studios may be used to create and edit digital designs. For example, certain companies support website-based design studios that enable users to create digital designs from scratch or using templates.

In certain circumstances, an individual may wish to create and share digital designs across multiple online services (e.g., multiple social networking services). However, different online services have different formats, dimensions, and the like for their media, posts, features, and the like. For example, a background or "cover" photo on one social networking service is a different size than a background or cover photo on another social networking service, which is a different size than a profile picture on an additional social networking service. Currently, the process of creating digital designs to be used or shared across multiple online services, and in the right format for the multiple online services, is ineffective and time consuming, as individuals must manually modify each digital design according to the format of the respective online service.

Thus, there is an opportunity for systems and methods to efficiently and effectively support the creation and modification of digital designs that may be used and shared across multiple online services.

SUMMARY

In an embodiment, a computer-implemented method of managing formats for a digital design is provided. The computer-implemented method may include: displaying, in a user interface, the digital design comprising a set of design elements; accessing, by a processor, a plurality of formats for the digital design, the plurality of formats respectively associated with a plurality of online accounts; displaying, in the user interface, the digital design in each format of the plurality of formats; receiving, via the user interface, an edit to the digital design displayed in a first format of the plurality of formats; and updating, by the processor in the user interface based on the edit, the digital design displayed in the first format.

In another embodiment, a system for managing formats for a digital design is provided. The system may include a user interface, a memory storing a set of computer-readable instructions, and a processor interfacing with the user interface and the memory. The processor may be configured to execute the set of computer-readable instructions to cause the processor to: cause the user interface to display the digital design comprising a set of design elements, access a plurality of formats for the digital design, the plurality of formats respectively associated with a plurality of online accounts, cause the user interface to display the digital design in each format of the plurality of formats, receive, via the user interface, an edit to the digital design displayed in a first format of the plurality of formats, and cause the user interface to update, based on the edit, the digital design displayed in the first format.

Further, in an embodiment, a non-transitory computer-readable storage medium having stored thereon a set of instructions, executable by at least one processor, for managing formats for a digital design is provided. The instructions may include: instructions for displaying, in a user interface, the digital design comprising a set of design elements; instructions for accessing a plurality of formats for the digital design, the plurality of formats respectively associated with a plurality of online accounts; instructions for displaying, in the user interface, the digital design in each format of the plurality of formats; instructions for receiving, via the user interface, an edit to the digital design displayed in a first format of the plurality of formats; and instructions for updating, in the user interface based on the edit, the digital design displayed in the first format.

DETAILED DESCRIPTION

Figure 1A:
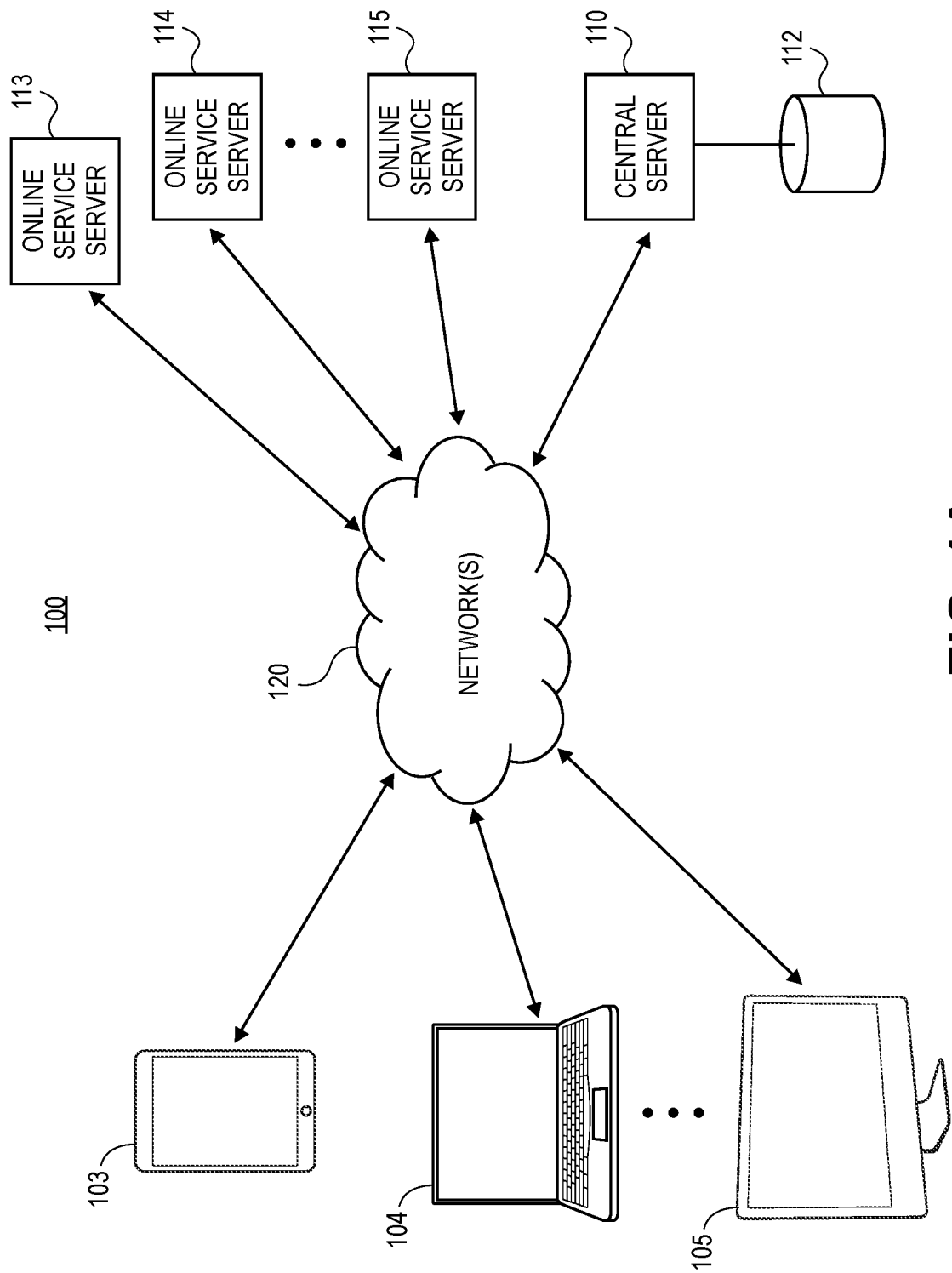
FIG. 1A depicts an overview of components and entities associated with the systems and methods, in accordance with some embodiments.

The present embodiments may relate to, inter alia, platforms and technologies for creating digital designs. According to certain aspects, the systems and methods may support effective and efficiently creating a digital design in multiple formats to be used in association with multiple online services. Generally, a digital design may have a set of visual design elements, where a specific format for the digital design may have a defined size, orientation, and/or other characteristics. A user may have an account with or otherwise interface with a set of online services, where the user may envision creating a digital design in multiple formats having a similar look and feel that may be shared or communicated across the set of online services.

The systems and methods may access or determine, for each of the set of online services, characteristics or parameters for a digital design(s) that is shared or communicated within that online service. For example, a shared photo in one online service may have different dimensions than a background photo for another online service. The systems and methods may enable a user to select which online service(s) are desired, and may enable the user to create and edit a set of digital designs that correspond to the set of selected online services. Additionally, the systems and methods may enable the user to save/download the created digital design(s) and/or share/communicate the created digital designs within the online service(s).

Throughout this disclosure, it is generally described that a digital design may be in multiple formats, each format associated with a particular online service, even though the multiple formats may be different (e.g., different dimensions, characteristics, etc.). Thus, a singular digital design may be in multiple different formats (e.g., a digital design may be a profile picture for one online service, and the digital design may be background photo for another online service). In this instance, it is generally understood that the digital design shares common or similar design elements across the different formats. However, it should be appreciated that the systems and methods may be described in the context of multiple digital designs, each of which is associated with a format of a set of multiple formats, and where the multiple digital designs share common or similar design elements. Thus, a first digital design may be in a first format associated with a first online service, and a second digital design may be in a second format associated with a second online service, where the first digital design and the second digital design share common or similar design elements.

The systems and methods offer numerous benefits. In particular, the systems and methods enable efficient and effective creation and editing of digital designs for use across multiple online services. The systems and methods may automatically and dynamically access and maintain characteristics (e.g., formats) for digital designs for the multiple online services, instead of a user manually creating and editing digital designs in different formats. Thus, content creators, businesses, and other parties or individuals may employ the systems and methods to reduce the time, effort, and costs needed to create and edit digital designs. It should be appreciated that additional benefits are envisioned.

The systems and methods discussed herein improve the functioning of a computer as well as improve virtual design platforms. Conventionally, users manually create and edit digital designs in different formats specific to different online services, which requires the user to ascertain aspects of the different formats, individually create/edit the digital designs, and individually facilitate communicating and sharing the digital designs in the online services. The systems and methods are an improvement to virtual design platforms because the systems and methods automatically access or determine design formats for multiple online services, and enable a user a platform to create and edit a digital design in multiple formats for the multiple online services within a single interface.

FIG. 1A illustrates an overview of a system 100 of components configured to facilitate the systems and methods. It should be appreciated that the system 100 is merely an example and that alternative or additional components are envisioned.

As illustrated in FIG. 1A, the system 100 may include a set of electronic devices 103, 104, 105 which may be used or operated by a set of users, such as any individual or person who may be interested in creating, sharing, and/or saving a digital design(s). Each of the electronic devices 103, 104, 105 may be any type of electronic device such as a mobile device (e.g., a smartphone), desktop computer, notebook computer, tablet, phablet, GPS (Global Positioning System) or GPS-enabled device, smart watch, smart glasses, smart bracelet, wearable electronic, PDA (personal digital assistant), pager, computing device configured for wireless communication, and/or the like. Each of the electronic devices 103, 104, 105 may execute or interface with an design application or platform that enables the creating, sharing, and/or saving of the digital design(s).

The electronic devices 103, 104 105 may communicate with a central server 110 via one or more networks 120. The central server 110 may be associated with the entity that owns, operates, and/or manages the design application or platform. In particular, the central server 110 may include or support a web server configured to host a website that enables users to operate the design application or platform. Further, the central server 110 may support a software application executable by the set of electronic devices 103, 104, 105 (i.e., the set of electronic devices 103, 104, 105 may interface with the central server 110 in executing the software application). In embodiments, the network(s) 120 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others).

Although depicted as a single central server 110 in FIG. 1A, it should be appreciated that the server 110 may be in the form of a distributed cluster of computers, servers, machines, or the like. In this implementation, the entity may utilize the distributed server(s) 110 as part of an on-demand cloud computing platform. Accordingly, when the electronic devices 103, 104, 105 interface with the server 110, the electronic devices 103, 104, 105 may actually interface with one or more of a number of distributed computers, servers, machines, or the like, to facilitate the described functionalities.

The system 100 may further include a set of online service servers 113, 114, 115, each of which may configure, support, and/or manage an online service for which a user may create and maintain an account, or otherwise interface with using the electronic devices 103, 104, 105. Each online service may enable a user to create, upload, save, and/or share digital designs, where each online service may or may not be a social networking service that enables users to connect with each other, "follow" each other, or otherwise associate with each other, as well as share and/or send electronic communications (e.g., digital designs or other communications) with each other. For example, an online service may be a social networking service that enables a user to upload a profile picture and/or a cover photo, share a image post on a feed, share a temporary post or "story", and/or facilitate other electronic communications. Each of the online services may have different interfaces, layouts, formats, and the like for digital designs. For example, a first digital design (e.g., a digital image) for a first online service may be of a first format, and a second digital design for a second online service may be of a second, different format.

The central server 110 may be configured to interface with or support a memory or storage 112 capable of storing various data, such as in one or more databases or other forms of storage. According to embodiments, the storage 112 may store data or information associated with digital designs, formats, templates, and/or design elements for the digital designs and templates. For example, the storage 112 may store templates of digital designs, including design elements for the different templates. For further example, the storage 112 may store information associated with the formats for digital designs supported by the online services of the set of online service servers 113, 114, 115, including properties and dimensions of the elements/components of the digital designs. It should be appreciated that the central server 110 and the set of electronic devices 103, 104, 105 may interface with the set of online service servers 113, 114, 115 to access and retrieve the formats for the digital designs.

Although three (3) electronic devices 103, 104, 105, three (3) online service servers, and one (1) central server 110 are depicted in FIG. 1A, it should be appreciated that greater or fewer amounts are envisioned. For example, there may be multiple central servers, each one associated with a different entity.

Figure 1B:
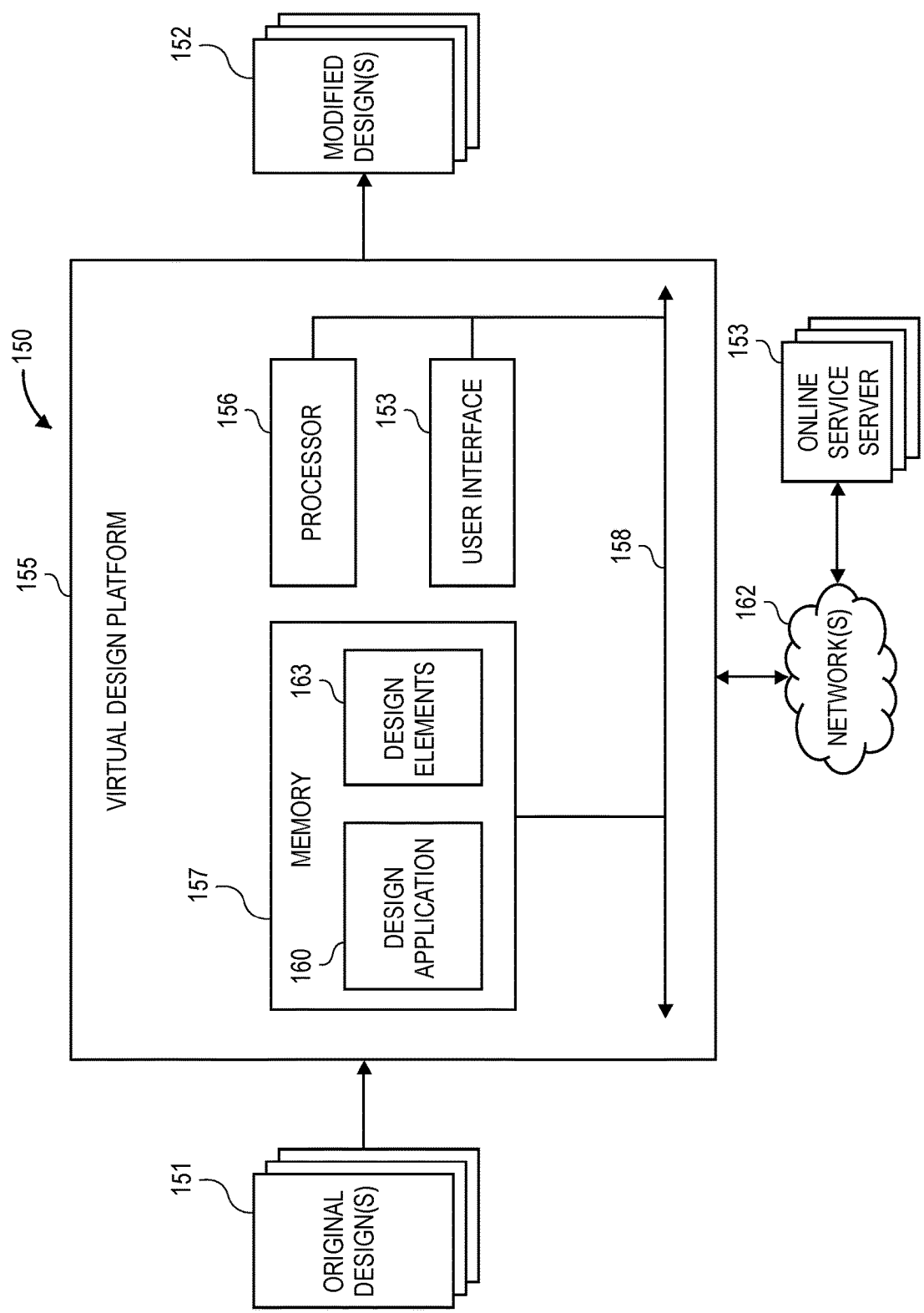
FIG. 1B depicts an overview of certain components configured to facilitate the systems and methods, in accordance with some embodiments.

According to embodiments, users of the electronic devices 103, 104, 105 may select a digital design(s) to create and/or modify using the electronic devices 103, 104, 105, such as in contemplation of sending, sharing, or posting on one or more online services. The digital design(s) may include at least one digital image or video in various file formats (e.g., JPEG, TIFF, GIF, PNG, Raw, MP4, MOV, etc.), where the digital image(s) or video(s) may depict visual content (i.e., the design itself) that may be composed of one or more design elements. The users may use the respective electronic devices 103, 104, 105 to modify certain of the design elements across one or more formats. When a particular digital design is complete, the user may select to send, share, or post on the appropriate online service, where multiple versions of the digital design (e.g., the digital design in different formats) may be respectively shared across multiple online services. FIG. 1B depicts more specific components associated with the systems and methods.

FIG. 1B an example environment 150 in which an original design(s) 151 is processed into a modified design(s) 152 via a virtual design platform 155, according to embodiments. The virtual design platform 155 may be implemented on any computing device, including one or more of the electronic devices 103, 104, 105 or the server 110 as discussed with respect to FIG. 1A. Components of the computing device may include, but are not limited to, a processing unit (e.g., processor(s) 156), a system memory (e.g., memory 157), and a system bus 158 that couples various system components including the memory 157 to the processor(s) 156. In some embodiments, the processor(s) 156 may include one or more parallel processing units capable of processing data in parallel with one another. The system bus 158 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The virtual design platform 155 may further include a user interface 153 configured to present content (e.g., digital designs and components/elements thereof). Additionally, a user may make selections to the content via the user interface 153, such as to modify digital designs (or design elements thereof) presented thereon. The user interface 153 may be embodied as part of a touchscreen configured to sense touch interactions and gestures by the user. Although not shown, other system components communicatively coupled to the system bus 158 may include input devices such as a cursor control device (e.g., a mouse, trackball, touch pad, etc.) and keyboard (not shown). A monitor or other type of display device may also be connected to the system bus 158 via an interface, such as a video interface. In addition to the monitor, computers may also include other peripheral output devices such as a printer, which may be connected through an output peripheral interface (not shown).

The memory 157 may include a variety of computer-readable media. Computer-readable media may be any available media that can be accessed by the computing device and may include both volatile and nonvolatile media, and both removable and non-removable media. By way of non-limiting example, computer-readable media may comprise computer storage media, which may include volatile and nonvolatile, removable and non-removable media implemented in any method or technology for storage of information such as computer-readable instructions, routines, applications (e.g., a design application 160) data structures, program modules or other data. Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the processor 156 of the computing device.

The virtual design platform 155 may operate in a networked environment and communicate with one or more online service servers 153 (such as the online service servers 113, 114, 115 described in FIG. 1A), via a network 162, such as a local area network (LAN), a wide area network (WAN), or other suitable network.

According to embodiments, the virtual design platform 155 (and more particularly, the design application 160) may process or modify the original design(s) 151 to produce the modified design(s) 152. Each of the original design(s) 151 and each of the modified design(s) 152 may be embodied as any type of electronic image, video, document, file, template, etc., that may include a set of design elements or components, each of which may include some type of displayable content (e.g., a combination of textual and/or visual content).

According to embodiments, the design application 160 may enable a user to select the original design 151, as well as specify which online services are desired for which to create, in formats corresponding to the online services, a digital design based on the original design 151. Thus, there may be a single original design 151 in multiple formats corresponding to the specified online services. The user may select the original design 151 from a set of templates, may search for the original design 151, or may create the original design 151 from a blank or saved electronic document.

Further, the design application 160 may enable the user to modify certain aspects of the original design(s) 151 to create modified design(s) 152 to share, communicate, or save in association with the respective online services. Aspects or properties may vary among the formats of the original design(s) 151 based on the corresponding online service. For example, one format of the original design 151 may be a square "profile picture" having dimensions of 180×180 pixels, and another format of the original design 151 may be a rectangular "cover photo" have dimensions of 820×312 pixels.

Additionally, the various formats of the original design(s) 151 may have common or similar design elements, however the design elements may be located or arranged in different portions or parts of the corresponding format. For example, a rectangular format of the original design 151 may have design elements spaced out across the longer dimension while a square format of the original design 151 may have design elements spaced evenly throughout its dimensions.

When the design application 160 modifies the original design 151 in a given format, the design application 160 may automatically propagate or apply the modification to the original design 151 in a remainder of the formats. For example, if the user causes the design application 160 to add the text "Las Vegas, Nev." to a profile picture version of the original design 151 for a first social networking service, the design application 160 may automatically add the text "Las Vegas, Nev." to a "live story" version of the original design 151 for a second social networking service, and to a background photo version of the original design 151 for the first social networking service.

According to embodiments, when the original design(s) 151 is created and/or modified according to a desired format(s), the virtual design platform 155 may output the modified design(s) 152. Thus, the modified design(s) 152 may be, for each format in the desired format(s), a modified version of the original design(s) 151. The virtual design platform 155 may enable store the modified design(s) 152 in the memory 157 or other storage, and/or may upload the modified design(s) 152 to the online service server(s) 153 for use in association with the online services.

According to embodiments, the original design(s) 151 and the modified design(s) 152 may include at least one digital image or video in various file formats (e.g., JPEG, TIFF, GIF, PNG, Raw, MP4, MOV, etc.). The memory 157 may further store design elements 163 accessible to the design application 160, for example to create and modify versions of the original design(s) 151.

FIGS. 2A-2G illustrate example interfaces associated with a virtual design platform, where the virtual design platform may support a design application (such as the design application 160 as discussed with respect to FIG. 1B). The example interfaces, thus, may be example interfaces of the design application. An electronic device may execute the design application and display the example interfaces in a user interface and receive selections associated with the example interfaces via the user interface. The electronic device may interface with other hardware components, such as a set of online service servers.

Figure 2A:
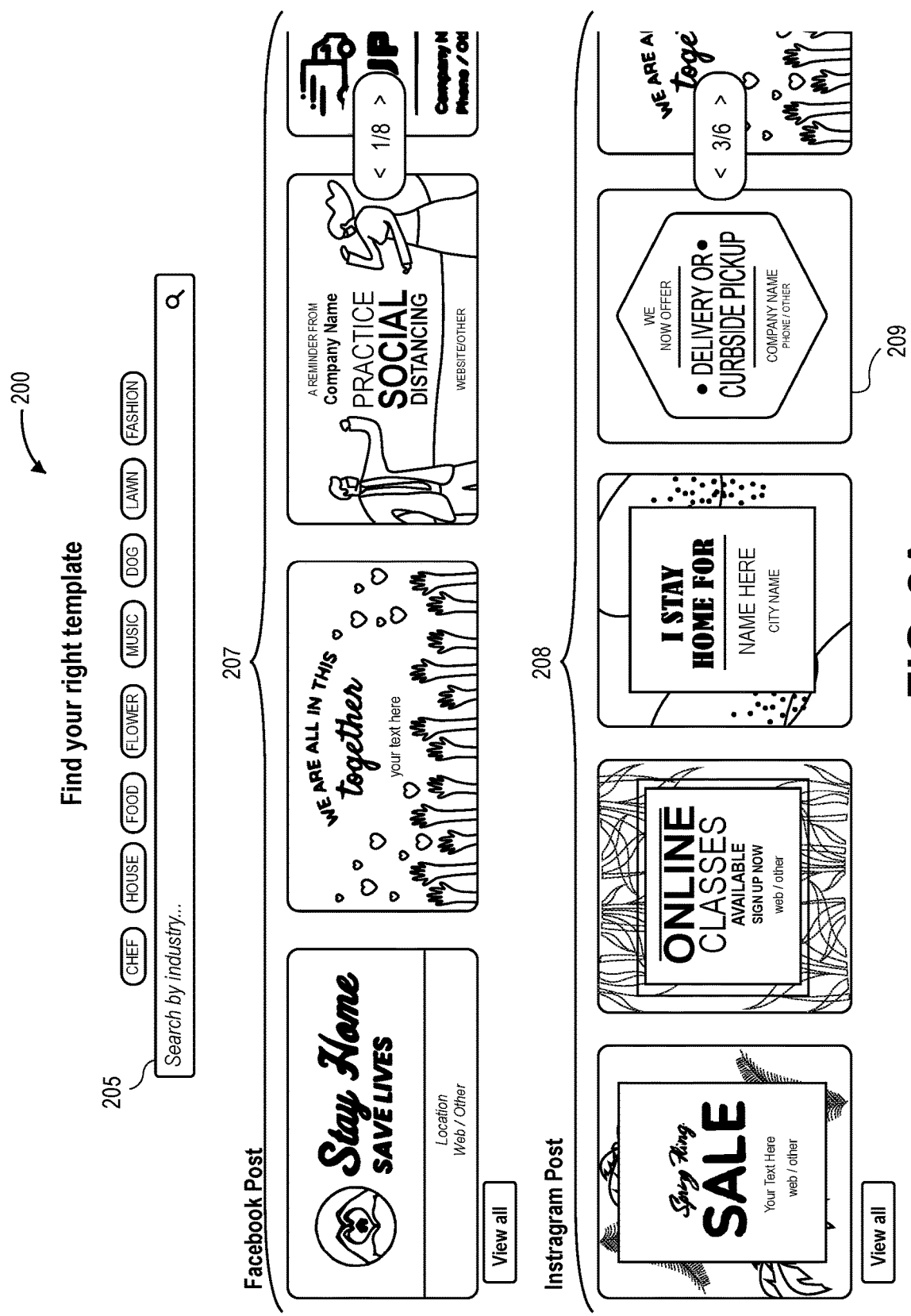
FIGS. 2A-2G illustrate various example interfaces of a design platform, in accordance with some embodiments.

FIG. 2A depicts an example interface 200 associated with a user searching for a template for a set of digital designs. The interface 200 may include a search bar 205 into which the user may input one or more search terms for a desired template. Further, the interface 200 may include a first set of templates 207 associated with a first online service and a second set of templates 208 associated with a second online service. According to embodiments, the user may select one of the templates from the first set of templates 207 or from the second set of templates 208, or another template. For example, the user may select a template 209.

Figure 2B:
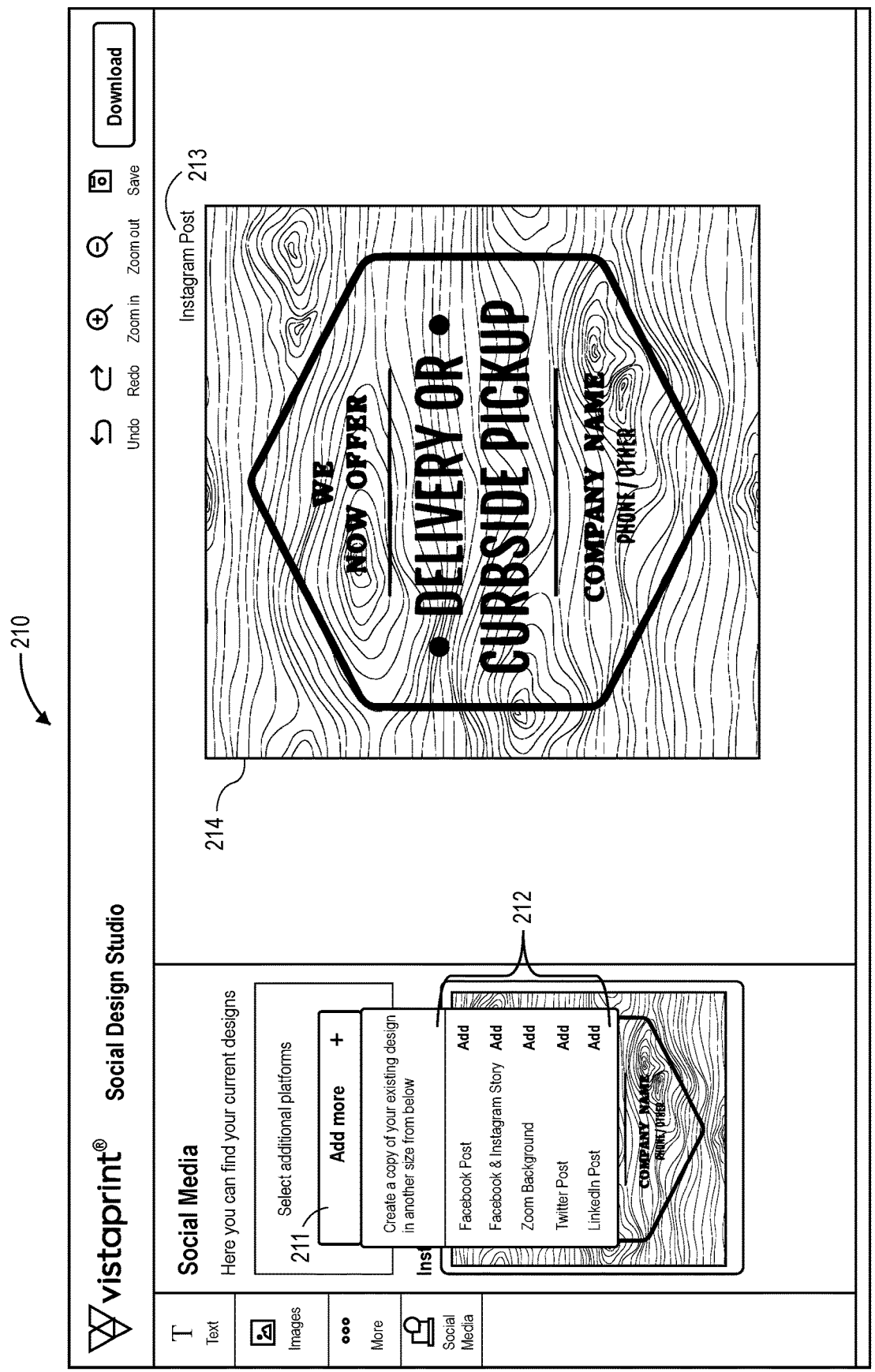

FIG. 2B illustrates an example interface 210 associated with editing a digital design associated with the selected template 209. The interface 210 may display a digital design in a first format 214 for the selected template 209 in a portion of the interface 210, and may indicate 213 the online service associated with the digital design in the first format 214.

The interface 210 may further include a menu 211 that may enable the user to add additional formats for the digital design. When a user selects to add more formats for the digital design, the interface 210 may display a set of options 212, along with a link to select each of the set of options 212.

When the user selects a given option of the set of options 212, the corresponding format of the digital design may be added to the interface 210.

Figure 2C:
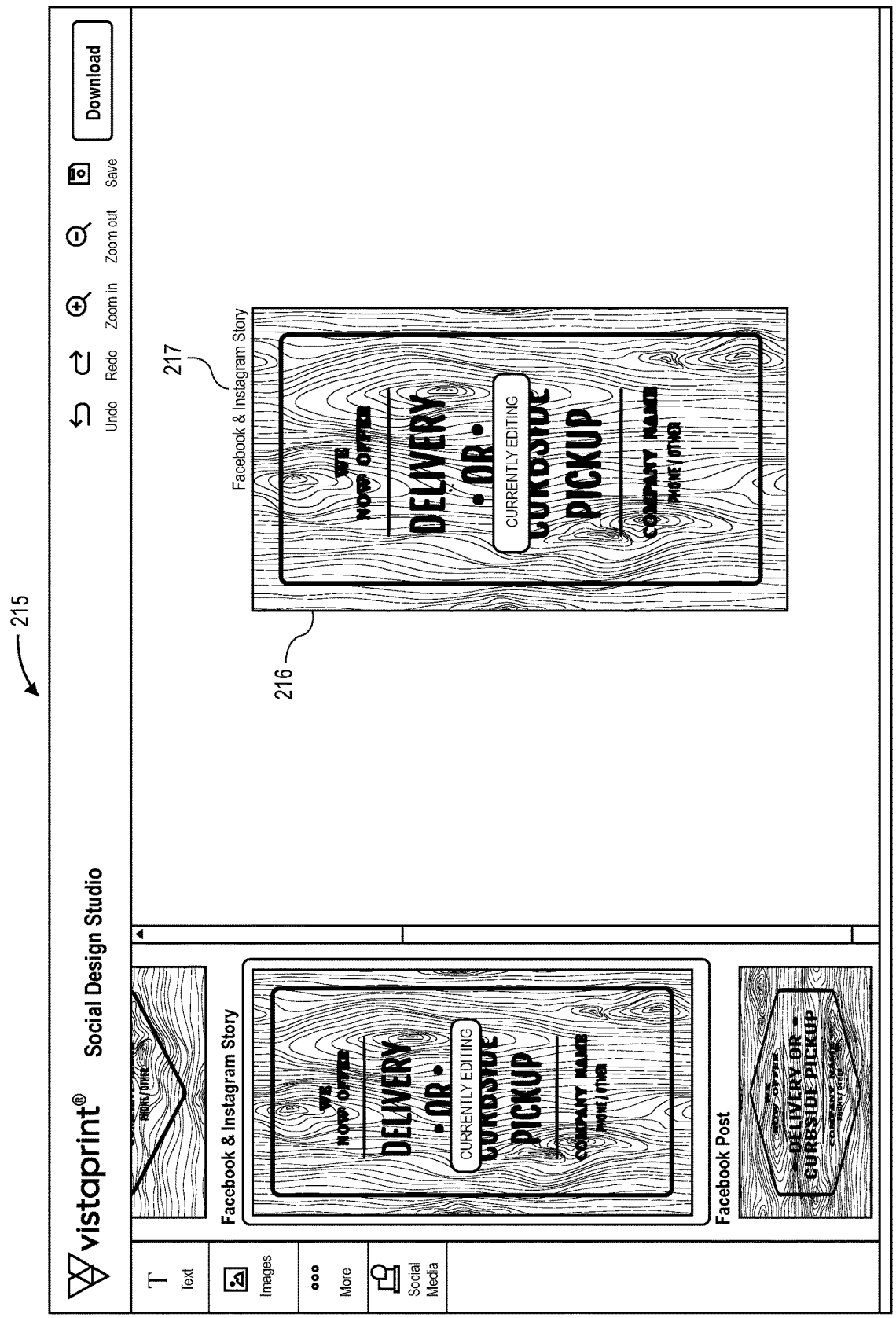

FIG. 2C illustrates an example interface 215 associated with editing multiple formats of the digital design associated with the selected template 209. The interface 215 may include a digital design in a second format 216 for the selected template 209 in a portion of the interface 215, and may indicate 217 the online service associated with the digital design in the second format 216. According to embodiments, the digital design in the first format 214 (and associated online service) of FIG. 2B is different than the digital design in the second format 216 (and associated online service) of FIG. 2C, but the underlying template is the same. In particular, the digital design in the first format 214 has design elements similar to those of the digital design in the second format 216 (e.g., the outline, the text, the general look and feel, etc.).

Figure 2D:
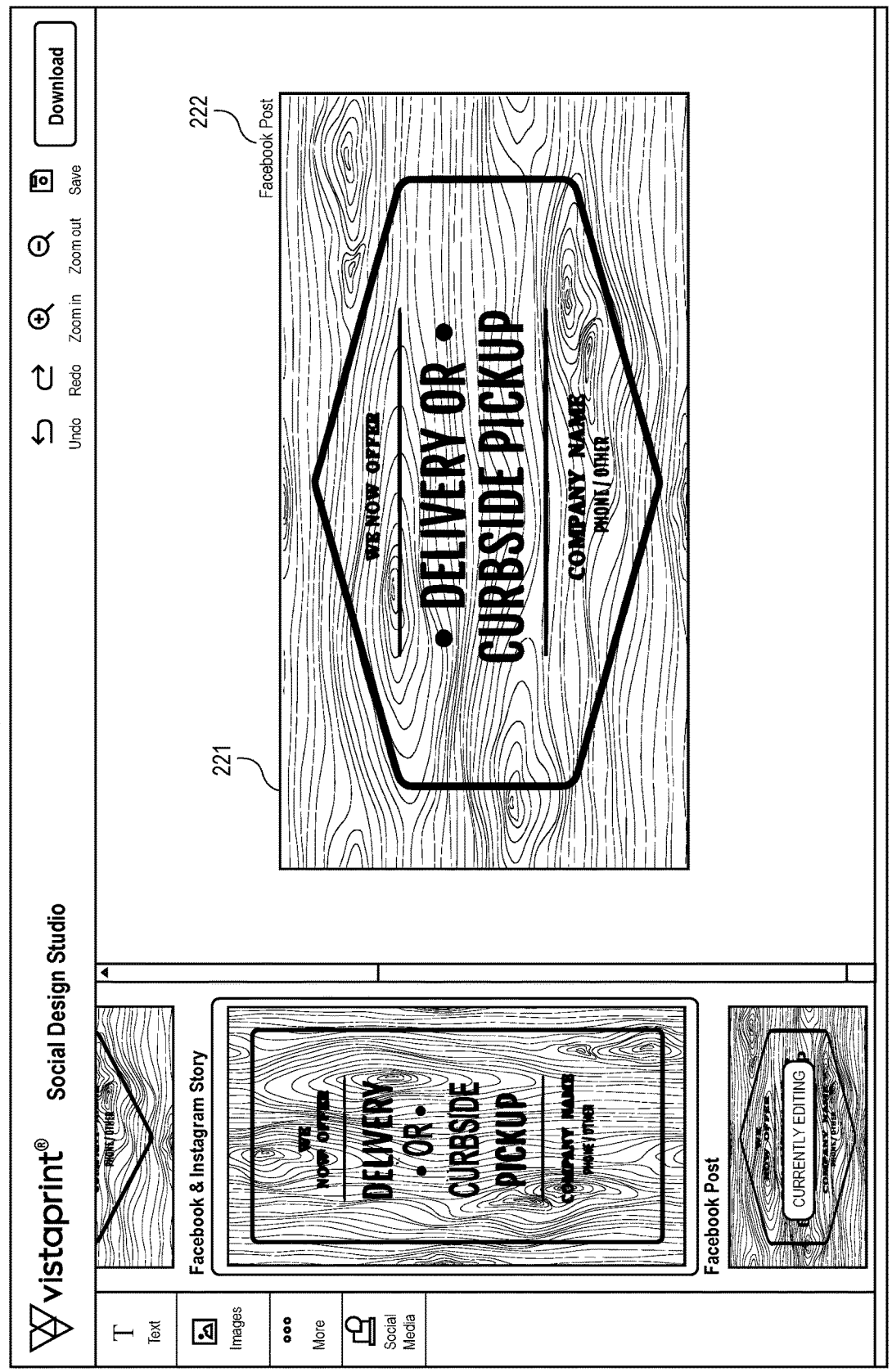

FIG. 2D illustrates another example interface 220 associated with editing multiple formats of the digital design associated with the selected template 209. The interface 220 may include a digital design in a third format 221 for the selected template 209 in a portion of the interface 220, and may indicate 222 the online service associated with the digital design in the third format 221. According to embodiments, the digital design in the first and second formats 214, 216 (and associated online services) of FIGS. 2B and 2C are different than the digital design in the third format 221 (and associated online service) of FIG. 2D, but the underlying template is the same. In particular, the digital design in the first and second formats 214, 216 has design elements similar to those of the digital design in the third format 221 (e.g., the outline, the text, the general look and feel, etc.).

Figure 2E:
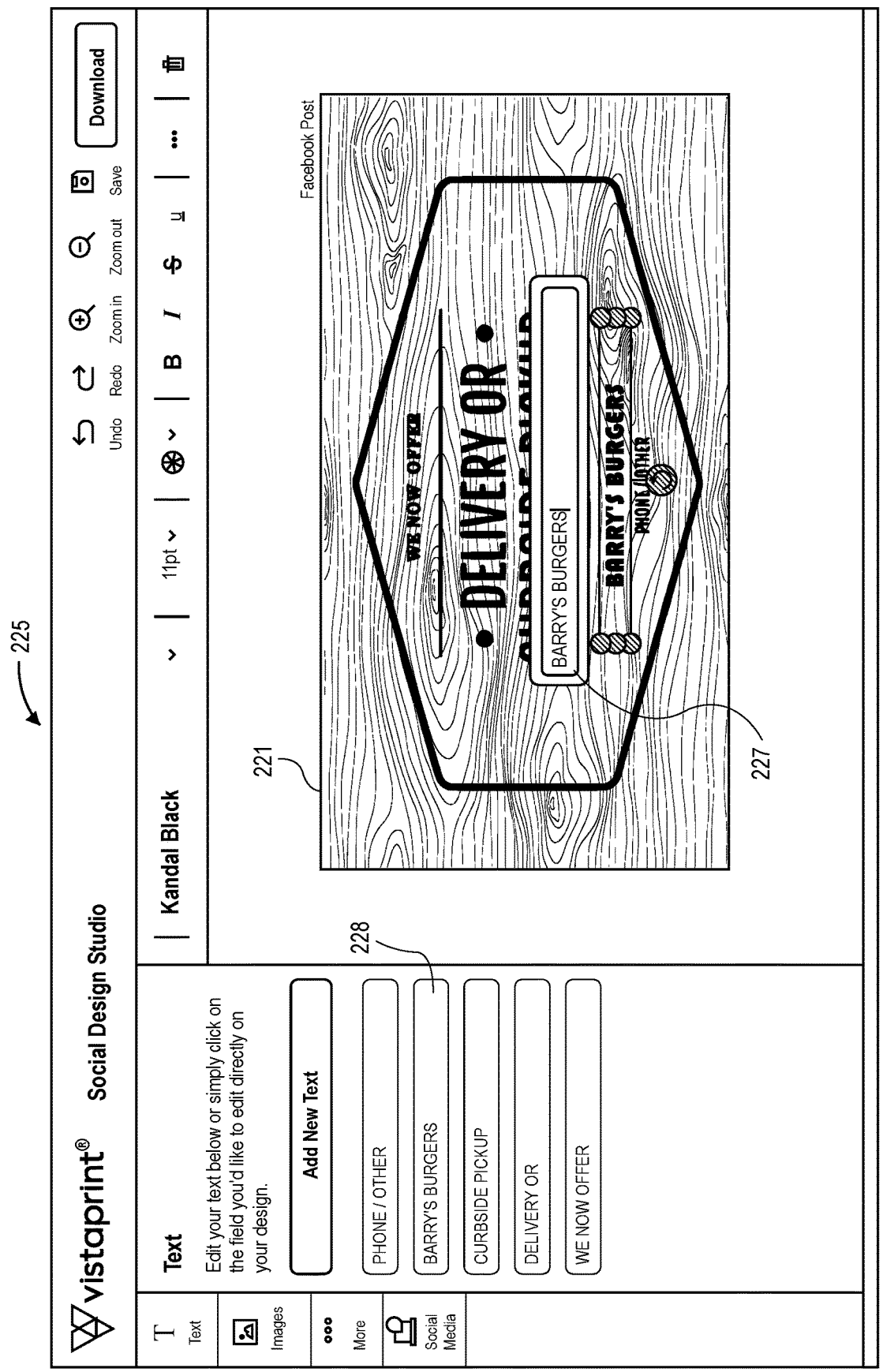

FIG. 2E depicts an example interface 225 associated with editing the digital design in the third format 221. The interface 225 may enable the user to input text in one of the fields of the digital design in the third format 221 (as shown: the text "BARRY'S BURGERS" in field 227). Alternatively, the user may populate field 228 with the text "BARRY'S BURGERS", and/or the fields 227, 228 may be linked such that texted entered in one field 227 (or 228) may propagate to the other field 228 (or 227).

According to embodiments, the electronic device may dynamically and automatically, and without user intervention, update the digital design in the first and second formats 214, 216 according to the updated field 227 (i.e., the electronic device may add the text "BARRY'S BURGERS" to the digital design in the first and second formats 214, 216). In particular, the electronic device may automatically determine that the field 227 is updated, identify the corresponding field(s) in other format(s) of the digital design, and update the corresponding field(s) according to align with or match the updated field 227. In an implementation, the electronic device may enable the user to manually update the different formats of the digital design.

Figure 2F:
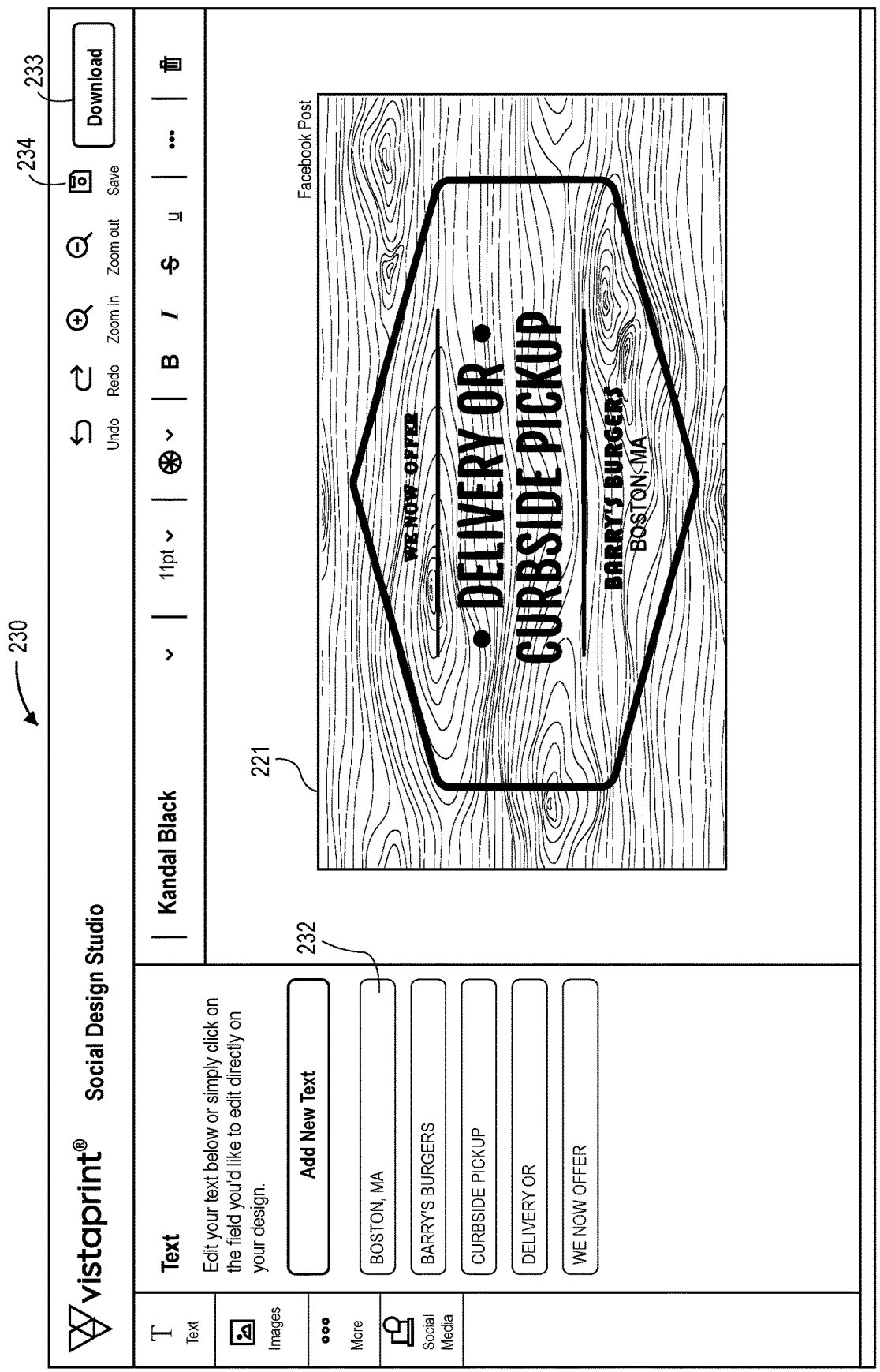

FIG. 2F depicts an example interface 230 associated with editing the digital design in the third format 221. Like the interface 225 of FIG. 2E, the interface 230 may enable the user to input text in one of the fields of the digital design of the third format 221 (as shown: the text "BOSTON, MA" in field 232). When the text is entered into the field 232, the digital design in the third format 221 may automatically update to reflect the entered text. It should be appreciated that the user may additionally update the digital design in the third format 221 via the interface 230 to a desired detail. According to embodiments, the electronic device may dynamically and automatically, and without user intervention, update the digital design in the first and second formats 214, 216 according to the updated field 232 (i.e., the electronic device may add the text "BOSTON, MA" to the digital design in the first and second formats 214, 216)

The interface 230 further includes a set of additional selections, including a save selection 234 and a download selection 233, among other selections. In response to the user selecting the save selection 234, the computing device may enable the user to select to save the digital design in one or more of the formats, such as to an account of the user associated with the design platform. Similarly, in response to the user selecting the download selection 233, the computing device may enable the user to select to download (e.g., locally or to cloud-based storage) the digital design in one or more of the formats.

Figure 2G:
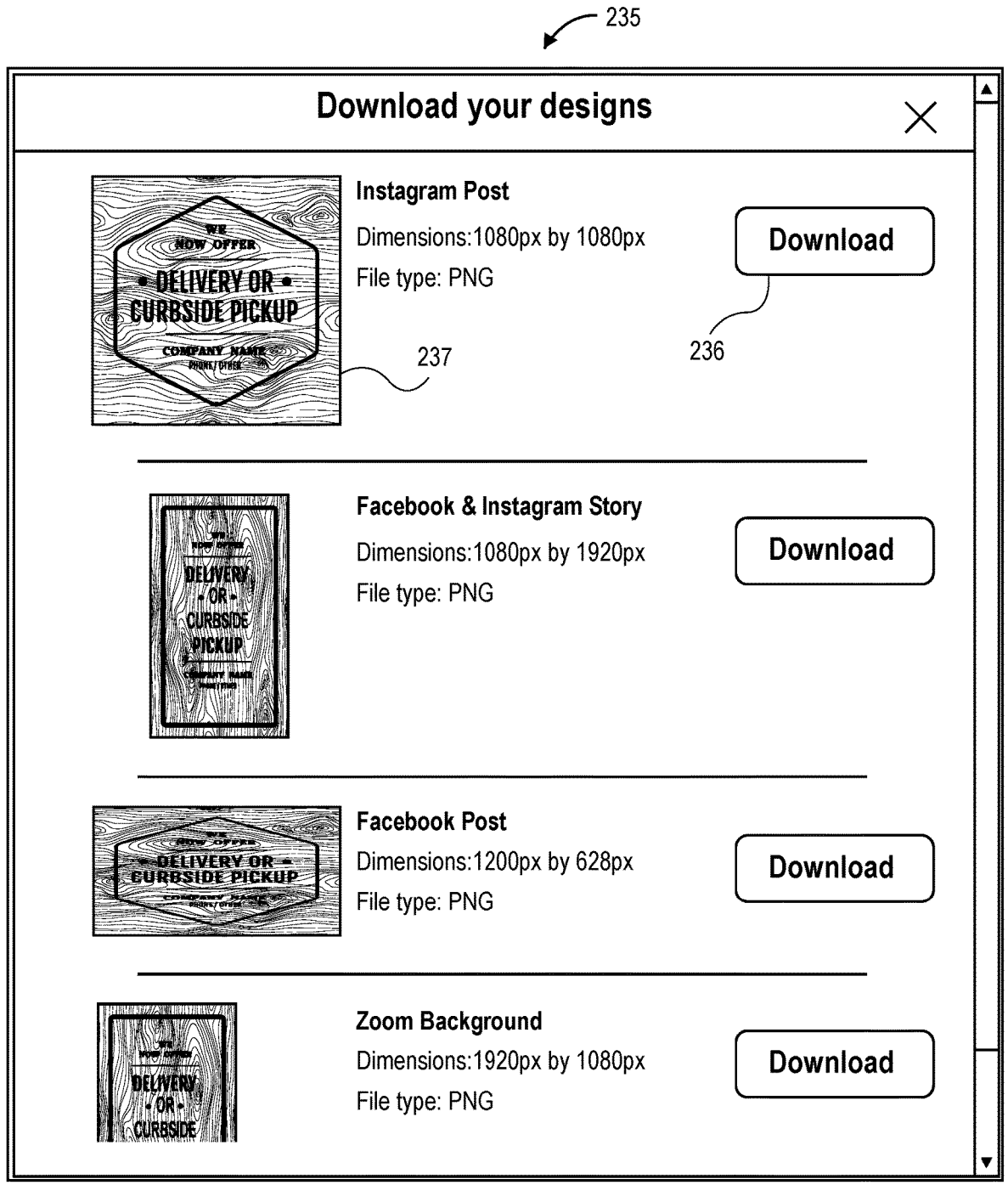

FIG. 2G is an example interface 235 depicting selections to download the digital design in one or more formats that are created and/or edited by the user. For example, the interface 235 includes a selection 236 to download the digital design in a first format 237 (as shown: a square shape with a dimension 1080 pixels×1080 pixels).

Although not shown in FIGS. 2A-2G, it should be appreciated that the virtual design platform may, for example in response to a user selection, automatically upload, publish, share, or otherwise avail any or all of the formats of the digital designs to corresponding online services. In an implementation, the electronic device may enable the user to select to individually upload, publish, share, or otherwise avail any or all of the formats of the digital designs to corresponding online services.

Figure 3:
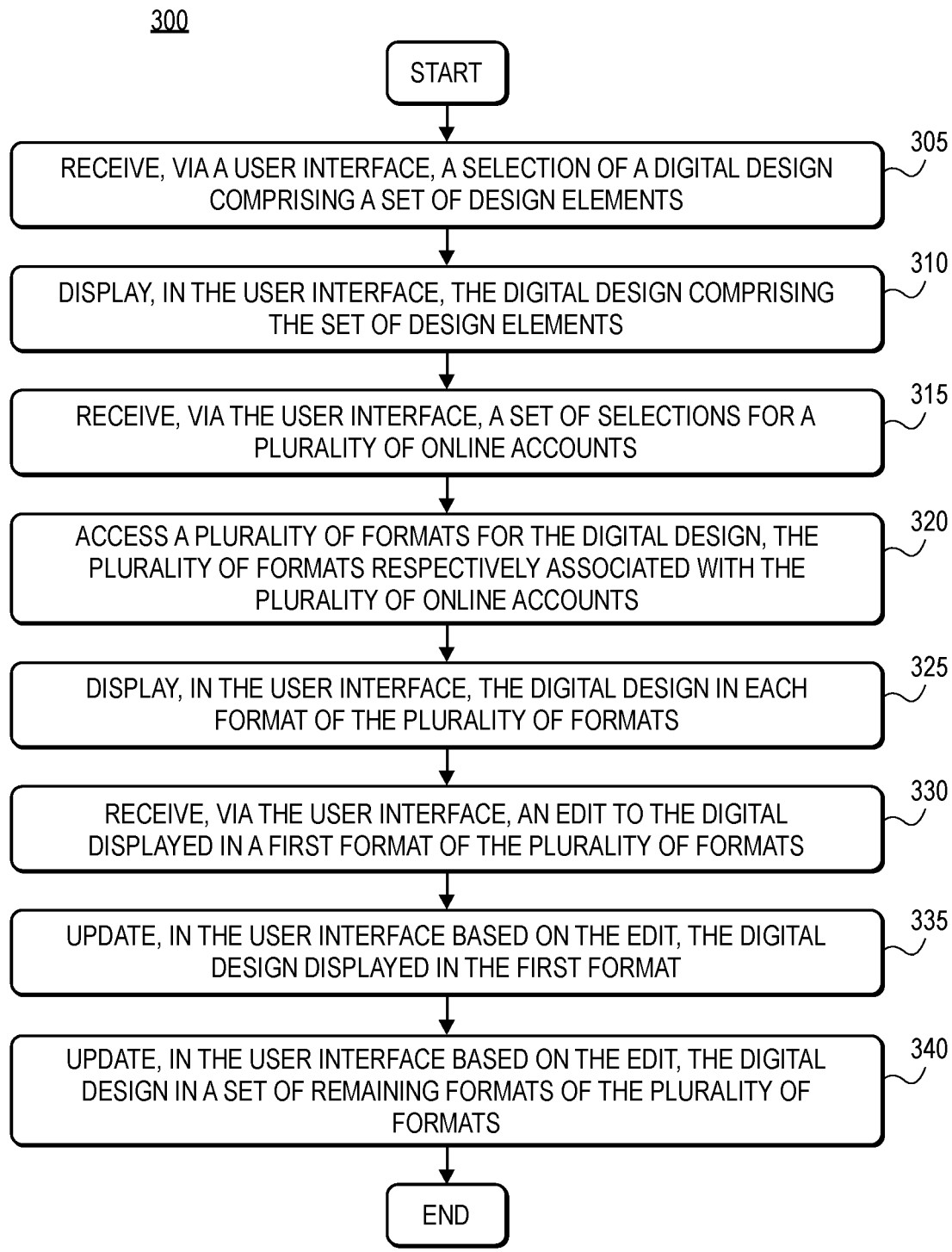
FIG. 3 depicts an example flow diagram associated with managing formats for a digital design, in accordance with some embodiments

FIG. 3 depicts is a block diagram of an example method 300 of managing formats for a digital design. The method 300 may be facilitated by an electronic device (such as any of the devices 103, 104, 105 as depicted in FIG. 1A) that may be in communication with a server(s) (such as the central server 110 and the online service server(s) 113, 114, 115 as discussed with respect to FIG. 1A). In embodiments, the method 300 may be at least partially facilitated by a remote server, such as the central server 110 as discussed with respect to FIG. 1A. Further, the electronic device may operate or interface with a virtual design platform, such as via a website, application, or the like.

The method 300 may begin when the electronic device receives (block 305), via a user interface, a selection of a digital design comprising a set of design elements. According to embodiments, the selection may be associated with a first online account of a plurality of online accounts. Thus, the digital design may have characteristics or parameters that align with the first online account (e.g., formatting and a use type within the first online account). It should be appreciated that the digital design may be associated with a template that the user may identify through browsing or searching, where the template may have a set of default design elements (e.g., borders, colors, shading, alphanumeric text of different fonts/sizes, objects or shapes, and/or other visual layout options). The electronic device may display (block 310), in the user interface, the digital design comprising the set of design elements.

The electronic device may receive (block 315), via the user interface, a set of selections for a plurality of online accounts, where the plurality of online accounts may be operated or managed by a respective plurality of online services (e.g., social networking services). In embodiments, the user may select the plurality of online accounts via a drop-down menu, or via another selection mechanism. Further, the user may select which desired type/format of the digital design for which particular online account. For example, the user may select a background image for a first online account, a profile picture for the first online account, and a profile picture for a second online account.

The electronic device may access (block 320) a plurality of formats for the digital design, where the plurality of formats may be respectively associated with the plurality of online accounts. In embodiments, each format of the plurality of formats may specify a set of dimensions and a layout (i.e., positioning) of the set of design elements. For example, a profile picture for the first online account may have different dimensions and a different layout than a profile picture for the second online account. The electronic device may access the plurality of formats from local or remote storage, or may access the plurality of formats directly from the plurality of online services.

The electronic device may display (block 325), in the user interface, the digital design in each format of the plurality of formats. Thus, each displayed digital design may have common or similar design elements but different (or the same) formats depending on the format of the associated online account/online service. The user may navigate between and among the different digital designs via the user interface, such as to view and/or edit a desired format of the digital design.

The electronic device may receive (block 330), via the user interface, an edit to the digital design displayed in a first format of the plurality of formats. In embodiments, the user may edit the digital design in any way, including adding, modifying, or removing borders, colors, shading, alphanumeric text of different fonts/sizes, objects or shapes, and/or other design elements. Based on the edit, the electronic device may update (block 335), in the user interface, the digital design displayed in the first format. It should be appreciated that the electronic device may update the displayed digital design on a dynamic basis as the user edits the digital design.

The electronic device may also facilitate updating the digital design in the remaining formats associated with the remaining online services. In an embodiment, the electronic device may automatically update (block 340), in the user interface based on the edit, the digital design in a set of remaining formats of the plurality of formats. For example, if the user initially modifies text in the digital design of the first format, the electronic device may automatically and without user intervention modify the text in the digital design of the set of remaining formats. It should be appreciated that the electronic device may automatically update the digital design of the set of remaining formats based on other edits to other design elements. In another embodiment, the user may facilitate updating the digital design in other desired formats.

It should be appreciated that the electronic device may facilitate saving and/or downloading the digital design in any of the plurality of formats. Additionally, the electronic device may facilitate sharing or communicating the digital design in any of the plurality of formats within any of the online services.

Figure 4:
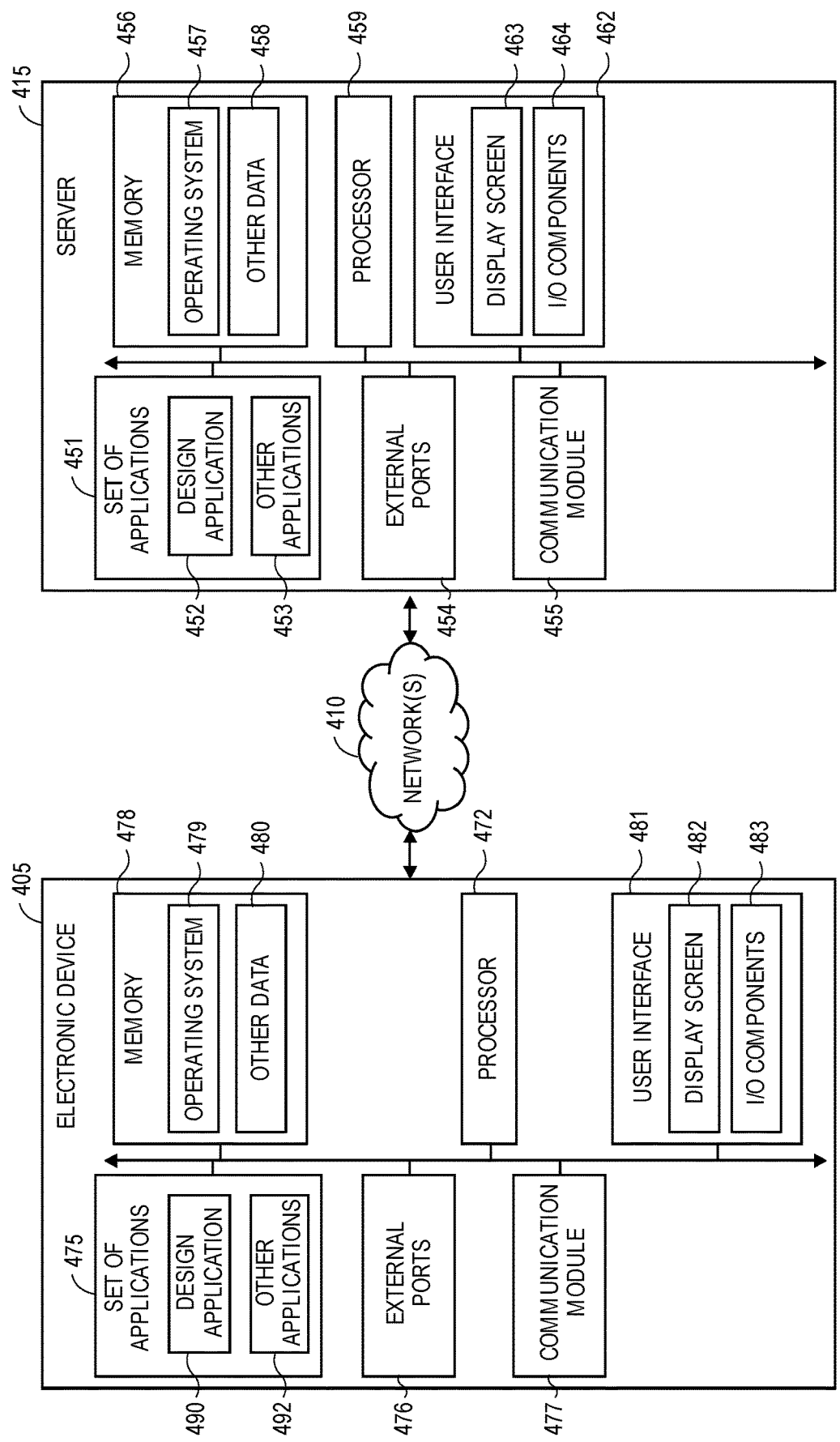
FIG. 4 is a block diagram of an example electronic device and an example server, in accordance with some embodiments.

FIG. 4 illustrates a hardware diagram of an example electronic device 405 (such as one of the electronic devices 103, 104, 105 as discussed with respect to FIG. 1A) and an example server 415 (such as the server computer 110 as discussed with respect to FIG. 1A), in which the functionalities as discussed herein may be implemented.

The electronic device 405 may include a processor 472 as well as a memory 478. The memory 478 may store an operating system 479 capable of facilitating the functionalities as discussed herein as well as a set of applications 475

(i.e., machine readable instructions). For example, one of the set of applications 475 may be a design application 490 configured to facilitate functionalities associated with creating and editing digital designs in various formats, as discussed herein. It should be appreciated that one or more other applications 492 are envisioned.

The processor 472 may interface with the memory 478 to execute the operating system 479 and the set of applications 475. According to some embodiments, the memory 478 may also include other data 480 including formatting data. The memory 478 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 405 may further include a communication module 477 configured to communicate data via one or more networks 410. According to some embodiments, the communication module 477 may include one or more transceivers (e.g., WWAN, WLAN, and/or WPAN transceivers) functioning in accordance with IEEE standards, 3GPP standards, or other standards, and configured to receive and transmit data via one or more external ports 476. For example, the communication module 477 may communicate with the server 415 via the network(s) 410.

The electronic device 405 may further include a user interface 481 configured to present information to a user and/or receive inputs from the user. As shown in FIG. 4, the user interface 481 may include a display screen 482 and I/O components 483 (e.g., ports, capacitive or resistive touch sensitive input panels, keys, buttons, lights, LEDs). According to some embodiments, the user may access the electronic device 405 via the user interface 481 to review various designs and preview images, and make various selections.

In some embodiments, the electronic device 405 may perform the functionalities as discussed herein as part of a "cloud" network or may otherwise communicate with other hardware or software components within the cloud to send, retrieve, or otherwise analyze data.

As illustrated in FIG. 4, the electronic device 405 may communicate and interface with the server 415 via the network(s) 410. The server 415 may include a processor 459 as well as a memory 456. The memory 456 may store an operating system 457 capable of facilitating the functionalities as discussed herein as well as a set of applications 451 (i.e., machine readable instructions). For example, one of the set of applications 451 may be a design application 452 configured to facilitate functionalities associated with creating and editing digital designs in various formats, as discussed herein. It should be appreciated that one or more other applications 453 are envisioned.

The processor 459 may interface with the memory 456 to execute the operating system 457 and the set of applications 451. According to some embodiments, the memory 456 may also include other data 458, such data received from the electronic device 405 and/or other data. The memory 456 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The server 415 may further include a communication module 455 configured to communicate data via the one or more networks 410. According to some embodiments, the communication module 455 may include one or more transceivers (e.g., WWAN, WLAN, and/or WPAN transceivers) functioning in accordance with IEEE standards, 3GPP standards, or other standards, and configured to receive and transmit data via one or more external ports 454.

The server 415 may further include a user interface 462 configured to present information to a user and/or receive inputs from the user. As shown in FIG. 4, the user interface 462 may include a display screen 463 and I/O components 464 (e.g., ports, capacitive or resistive touch sensitive input panels, keys, buttons, lights, LEDs). According to some embodiments, the user may access the server 415 via the user interface 462 to review information, make selections, and/or perform other functions.

In some embodiments, the server 415 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processors 472, 459 (e.g., working in connection with the respective operating systems 479, 457) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical.

What is claimed is:

1. A computer-implemented method of managing formats for a digital design, the computer-implemented method comprising:
displaying, in a user interface, the digital design comprising a set of design elements;
accessing, by a processor, a first format and a second format for the digital design, the first format and the second format respectively associated with a first online account and a second online account;
displaying, in the user interface, (i) the digital design in the first format in a first portion of the user interface, and (ii) the digital design in the second format in a second portion of the user interface;
receiving, via the user interface, an edit to the digital design displayed in the first format in the first portion of the user interface; and
in response to receiving the edit:
modifying, by the processor based on the edit, the digital design displayed in the first format in the first portion of the user interface, and
modifying, by the processor based on the edit, the digital design displayed in the second format in the second portion of the user interface, wherein the digital design in the first format that was modified and the digital design in the second format that was modified are concurrently displayed in the user interface.

2. The computer-implemented method of claim 1, wherein accessing the first format and the second format for the digital design comprises:
receiving, via the user interface, a set of selections for the first online account and the second online account; and
in response to receiving the set of selections, accessing, by the processor, the first format and the second format respectively associated with the first online account and the second online account.

3. The computer-implemented method of claim 1, wherein accessing the first format and the second format for the digital design comprises:
accessing, by the processor, the first format and the second format for the digital design, each of the first format and the second format specifying a set of dimensions and a layout of the set of design elements.

4. The computer-implemented method of claim 1, wherein accessing the first format and the second format for the digital design comprises:
accessing, by the processor from at least one of a set of remote servers or a database, the first format and the second format for the digital design.

5. The computer-implemented method of claim 1, wherein displaying the digital design comprises:
receiving, via the user interface, a selection of the digital design comprising the set of design elements, the selection associated with the first online account; and
in response to receiving the selection of the digital design, displaying, in the user interface, the digital design in the first format associated with the first online account.

6. The computer-implemented method of claim 1, further comprising:
sharing the digital design in the first format that was modified within the first online account.

7. A system for managing formats for a digital design, comprising:
a user interface;
a memory storing a set of computer-readable instructions; and
a processor interfacing with the user interface and the memory, and configured to execute the set of computer-readable instructions to cause the processor to:
cause the user interface to display the digital design comprising a set of design elements,
access a first format and a second format for the digital design, the first format and the second format respectively associated with a first online account and a second online account,
cause the user interface to display (i) the digital design in the first format in a first portion of the user interface, and (ii) the digital design in the second format in a second portion of the user interface,
receive, via the user interface, an edit to the digital design displayed in the first format in the first portion of the user interface, and
in response to receiving the edit:
cause the user interface to modify, based on the edit, the digital design displayed in the first format in the first portion of the user interface, and
cause the user interface to modify, based on the edit, the digital design displayed in the second format in the second portion of the user interface, wherein the digital design in the first format that was modified and the digital design in the second format that was modified are concurrently displayed in the user interface.

8. The system of claim 7, wherein to access the first format and the second format for the digital design, the processor is configured to:
receive, via the user interface, a set of selections for the first online account and the second online account, and
in response to receiving the set of selections, access the first format and the second format respectively associated with the first online account and the second online account.

9. The system of claim 7, wherein to access the first format and the second format for the digital design, the processor is configured to:
access the first format and the second format for the digital design, each of the first format and the second format specifying a set of dimensions and a layout of the set of design elements.

10. The system of claim 7, wherein to access the first format and the second format for the digital design, the processor is configured to:
access, from at least one of a set of remote servers or a database, the first format and the second format for the digital design.

11. The system of claim 7, wherein to cause the user interface to display the digital design, the processor is configured to:
receive, via the user interface, a selection of the digital design comprising the set of design elements, the selection associated with the first online account, and
in response to receiving the selection of the digital design, cause the user interface to display the digital design in the first format associated with the first online account.

12. The system of claim 7, wherein the processor is configured to execute the set of computer-readable instructions to further cause the processor to:
share the digital design in the first format that was modified within the first online account.

13. A non-transitory computer-readable storage medium having stored thereon a set of instructions, executable by at least one processor, for managing formats for a digital design, the instructions comprising:

instructions for displaying, in a user interface, the digital design comprising a set of design elements;

instructions for accessing a first format and a second format for the digital design, the first format and the second format respectively associated with a first online account and a second online account;

instructions for displaying, in the user interface, (i) the digital design in the first format in a first portion of the user interface, and (ii) the digital design in the second format in a second portion of the user interface;

instructions for receiving, via the user interface, an edit to the digital design displayed in the first format in the first portion of the user interface; and instructions for, in response to receiving the edit:
  modifying, based on the edit, the digital design displayed in the first format in the first portion of the user interface; and
  modifying, by the processor based on the edit, the digital design displayed in the second format in the second portion of the user interface, wherein the digital design in the first format that was modified and the digital design in the second format that was modified are concurrently displayed in the user interface.

14. The non-transitory computer-readable storage medium of claim 13, wherein the instructions for accessing the first format and the second format for the digital design comprise:
  instructions for receiving, via the user interface, a set of selections for the first online account and the second online account; and
  instructions for, in response to receiving the set of selections, accessing the first format and the second format respectively associated with the first online account and the second online account.

15. The non-transitory computer-readable storage medium of claim 13, wherein the instructions for accessing the first format and the second format for the digital design comprise:
  instructions for accessing the first format and the second format for the digital design, each of the first format and the second format specifying a set of dimensions and a layout of the set of design elements.

16. The non-transitory computer-readable storage medium of claim 13, wherein the instructions for accessing the first format and the second format for the digital design comprise:
  instructions for accessing, by the processor from at least one of a set of remote servers or a database, the first format and the second format for the digital design.

17. The non-transitory computer-readable storage medium of claim 13, wherein the instructions for displaying the digital design comprise:
  instructions for receiving, via the user interface, a selection of the digital design comprising the set of design elements, the selection associated with the first online account; and
  instructions for, in response to receiving the selection of the digital design, displaying, in the user interface, the digital design in the first format associated with the first online account.

* * * * *